US012748985B2

(12) United States Patent
Stepanova et al.

(10) Patent No.: US 12,748,985 B2
(45) Date of Patent: Sep. 29, 2026

(54) DEVICE AND COMPUTER IMPLEMENTED METHOD FOR ADDING A QUANTITY FACT TO A KNOWLEDGE BASE

(71) Applicant: Robert Bosch GmbH, Stuttgart (DE)

(72) Inventors: Daria Stepanova, Leonberg (DE); Dragan Milchevski, Leonberg (DE); Gerhard Weikum, Saarbrücken (DE); Jannik Stroetgen, Karlsruhe (DE); Vinh Thinh Ho, Saarbruecken (DE)

(73) Assignee: ROBERT BOSCH GMBH, Stuttgart (DE)

( * ) Notice: Subject to any disclaimer, the term of this patent is extended or adjusted under 35 U.S.C. 154(b) by 895 days.

(21) Appl. No.: 18/168,666

(22) Filed: Feb. 14, 2023

(65) Prior Publication Data

US 2023/0267341 A1 Aug. 24, 2023

(30) Foreign Application Priority Data

Feb. 18, 2022 (DE) ..................... 10 2022 201 732.3

(51) Int. Cl.
*G06N 5/022* (2023.01)

(52) U.S. Cl.
CPC .................................... *G06N 5/022* (2013.01)

(58) Field of Classification Search
CPC .. G06F 16/9024; G06F 16/252; G06F 16/283; G06F 16/288; G06F 40/295; G06F 40/30; G06F 3/0455; G06N 5/022; G06N 3/0455
See application file for complete search history.

(56) References Cited

U.S. PATENT DOCUMENTS

2011/0307435 A1* 12/2011 Overell ................. G06F 16/367 706/46
2018/0039695 A1* 2/2018 Chalabi .................. G06N 5/022

OTHER PUBLICATIONS

Ho et al., "QSEARCH: Answering Quantity Queries From Text," The Semantic Web—ISWC 2019: 18th International Semantic Web Conference, Proceedings, Part I., 2019, pp. 1-17 (Year: 2019).*
Saha et al. Boostrapping for Numerical Open IE, Proceedings of the 55th Annual Meeting of the Association for Computational Linguistics, vol. 2, 2017, pp. 317-323 (Year: 2017).*
Roy et al. "Reasoning About Quantities in Natural Language," Transactions of the Association for Computational Linguistics, vol. 3, 2015 (pp. 1-13) (Year: 2015).*

(Continued)

*Primary Examiner* — Charles D Adams
(74) *Attorney, Agent, or Firm* — NORTON ROSE FULBRIGHT US LLP

(57) ABSTRACT

In a device and a computer-implemented method for adding a quantity fact to a knowledge base, in particular a knowledge graph, the method includes: providing the knowledge base; providing a textual resource; providing an entity from the knowledge base; providing a relation from the knowledge base; providing a set of different units; determining a quantity comprising a unit within the set of different units that is within the textual resource depending on the entity, the relation, and the set of different units; determining a quantity fact comprising the entity, the relation, the quantity and the unit; and adding the quantity fact to the knowledge base.

4 Claims, 2 Drawing Sheets

(56) References Cited

OTHER PUBLICATIONS

Ho et al., "QSEARCH: Answering Quantity Queries From Text," the Semantic Web—ISWC 2019: 18th International Semantic Web Conference, Proceedings, Part I., 2019, pp. 1-17. <https://www.researchgate.net/publication/336601568_Qsearch_Answering_Quantity_Queries_from_Text> Downloaded Feb. 2, 2023.
Saha et al., "Open Information Extraction From Conjunctive Sentences," Proceedings of the 27th International Conference on Computational Linguistics, 2018, pp. 2288-2299. <https://aclanthology.org/C18-1194.pdf> Downloaded Feb. 2, 2023.
Saha et al., "Bootstrapping for Numerical Open IE," Proceedings of the 55th Annual Meeting of the Association for Computational Linguistics, vol. 2, 2017, pp. 317-323. https://aclanthology.org/P17-2050.pdf> Downloaded Feb. 2, 2023.
Hoffart et al., "Robust Disambiguation of Named Entities in Text," Proceedings of the 2011 Conference on Empirical Methods in Natural Language Processing, 2011, pp. 782-792. https://aclanthology.org/D11-1072.pdf> Downloaded Feb. 2, 2023.
Lee et al., "Higher-Order Coreference Resolution With Coarse-to-Fine Inference," Proceedings of the 2018 Conference of the North American Chapter of the Association for Computational Linguistics: Human Language Technologies, vol. 2, 2018, pp. 687-692. <https://aclanthology.org/N18-2108.pdf> Downloaded Feb. 2, 2023.
Shu et al., "DOC: Deep Open Classification of Text Documents," Proceedings of the 2017 Conference on Empirical Methods in Natural Language Processing, 2017, pp. 2911-2916. <https://aclanthology.org/D17-1314.pdf> Downloaded Feb. 2, 2023.
Roy et al., "Reasoning About Quantities in Natural Language," Transactions of the Association for Computational Linguistics, vol. 3, 2015, pp. 1-13. <https://aclanthology.org/Q15-1001.pdf> Downloaded Feb. 2, 2023.
Botev et al., "Kernel Density Estimation via Diffusion," The Annals of Statistics, vol. 38, No. 5, 2010, pp. 2916-2957. <https://projecteuclid.org/journals/annals-of-statistics/volume-38/issue-5/Kernel-density-estimation-via-diffusion/10.1214/10-AOS799.full> Downloaded Feb. 2, 2023.
Yagnik et al., "Learning People Annotation From the Web Via Consistency Learning," Proceedings of the 9th ACM SIGMM International Workshop on Multimedia Information Retrieval, MIR 2007, 2007, pp. 285-290.

* cited by examiner

DEVICE AND COMPUTER IMPLEMENTED METHOD FOR ADDING A QUANTITY FACT TO A KNOWLEDGE BASE

CROSS REFERENCE

The present application claims the benefit under 35 U.S.C. § 119 of German Patent Application No. DE 10 2022 201 732.3 filed on Feb. 18, 2022, which is expressly incorporated herein by reference in its entirety.

FIELD

The present invention concerns a device and computer implemented method for adding a quantity fact to a knowledge base.

BACKGROUND INFORMATION

Ho, V. T., Ibrahim, Y., Pal, K., Berberich, K., Weikum, G.; "Qsearch: Answering quantity queries from text;" in: The Semantic Web—ISWC 2019-18th International Semantic Web Conference, Auckland, New Zealand, Oct. 26-30, 2019, Proceedings, Part I. Lecture Notes in Computer Science, vol. 11778, Springer (2019) describes detecting numerical expressions with units in textual data.

The Qsearch provides a method for answering quantity-filter queries such as "Buildings higher than 100 m", and can be also adjusted for the extraction of quantity facts from large collections of documents. However, only the top-ranked facts produced by Qsearch as responses to quantity-filter queries are of high precision. Beyond the top-ranked facts, its precision deteriorates, by design.

SUMMARY

A computer-implemented method according to the present invention may achieve an extraction of the quantity facts with both high precision and high recall for the purpose of filling in particular gaps in a high-quality knowledge base with quantity facts.

According to an example embodiment of the present invention, the computer implemented method for adding a quantity fact to a knowledge base, in particular a knowledge graph, comprises providing the knowledge base, providing a textual resource, providing an entity from the knowledge base, providing a relation from the knowledge base, providing a set of different units, determining a quantity comprising a unit within the set of different units that is within the textual resource depending on the entity, the relation, and the set of different units, determining a quantity fact comprising the entity, the relation, the quantity and the unit, and adding the quantity fact to the knowledge base.

Determining the numerical representation of the quantity of the fact may comprise determining the quantity comprises finding a section of the textual resource that comprises at least one quantity depending on the unit, determining a context for the unit within the section, determining a plurality of tuples, wherein each tuple of the plurality of tuples comprises the entity, one of the at least one quantity, the unit, and the context, and selecting the quantity from one tuple of the plurality of tuples depending on the context. The context provides additional information for e.g. ranking the tuple against each other.

According to an example embodiment of the present invention, the method may comprise providing a reference for each tuple of the plurality of tuples, determining a similarity of at least one tuple of the plurality of tuples to the reference for this tuple, selecting the tuple from the plurality of tuples that comprises a context that is more similar to its reference than a context in at least one other tuple of the plurality of tuples is to its reference. The reference represents a target query. The more similar the context is to the reference, the better is the match of the tuple that is used to determine the quantity fact to the query.

Providing the reference for each tuple may comprise providing a reference predicate domain for the knowledge base, providing a reference entity from the knowledge base, and providing a set of reference units from the set of units. These references improve the query.

Determining the similarity may comprise determining if a numerical representation of the entity of the at least one tuple is mapped by a numerical representation of the reference predicate to a numerical representation that is within a predetermined distance to a numerical representation of the reference entity or not and determining if the unit of the at least one tuple is within the set of reference units or not, and determining the similarity between the context from the at least on tuple of the plurality of tuples to the reference for at least one tuple of the plurality of tuples for that the numerical representation of the entity of this at least one tuple is mapped by the numerical representation of the reference predicate to a numeric representation that is within the predetermined distance to the numerical representation of the reference entity and for that the unit of this at least one tuple is within the set of reference units. The numerical representations represent the entity and the references in an embedding space. This reduces the calculation resources required to fill the knowledge base because tuples are not considered if the distance is too far from the query in the embedding space.

Providing the reference for each tuple may comprise determining, for a tuple of the plurality of tuples, the reference that is more similar to the context in this tuple than to a context in at least one other tuple of the plurality of tuples. The context may be a bag of words. The query may represent several different bags of words each representing one predicate. The bag of words representing the predicate that is most similar is selected as reference.

According to an example embodiment of the present invention, the method may comprise determining a first score for at least one tuple of the plurality of tuples depending on the similarity to its reference, wherein the first score indicates a confidence for this at least one tuple being selectable for determining the quantity fact, and adding this at least one tuple to a group of tuples when the first score indicates that the confidence for this at least one tuple being selectable for determining the quantity fact is higher than a first threshold, wherein determining the quantity fact comprises selecting a tuple from the group of tuples. This reduces the calculation resources required to fill the knowledge base because tuples are not considered if the confidence is too low.

The method may comprise if the first score indicates a confidence of the at least one tuple being selectable as the fact that is below a second threshold, the method comprises determining a tuple in the plurality of tuples that is not in the set of numerical representations of candidate facts and has the same entity as a tuple of the set of candidate facts, determining a similarity depending on a quantity in this tuple of the plurality of tuples and the quantity in this tuple of the set of numerical representations of candidate facts, selecting the context in this tuple of the plurality of tuples as a candidate for another reference if the similarity is larger than a fourth threshold. This reduces the calculation resources required to fill the knowledge base because tuples are not considered if the likelihood is too low.

According to an example embodiment of the present invention, the method may comprise, if the first score indicates a confidence of the at least one tuple being selectable as the fact that is below a second threshold, the method comprises determining a tuple in the plurality of tuples that is not in the set of numerical representations of candidate facts and has the same numerical representation of the entity as a tuple of the set of numerical representations of candidate facts, determining a similarity depending on a numerical representation of a quantity in this tuple of the plurality of tuples and the numerical representation of the quantity in this tuple of the set of numerical representations of candidate facts, selecting the numerical representation of the context in this tuple of the plurality of tuples as a candidate for another reference if the similarity is larger than a fourth threshold.

According to an example embodiment of the present invention, the method may comprise determining the similarity depending on a normalization of the quantity in at least one of the tuples, wherein the normalization is determined depending on a unit in one of these tuples and/or in both of these tuples. This way, different units of the same quantity are comparable. This allows adding quantity facts to the knowledge base more efficiently.

A device according to the present invention may enable an extraction of the quantity facts with both high precision and high recall for filling in particular gaps in a high-quality knowledge base with quantity facts. The device for filling the knowledge base, in particular the knowledge graph, comprises at least one processor and at least one memory, wherein the at least one memory is capable of storing an embedding of a knowledge base and a numerical representation of a textual resource, and comprises instructions that, when executed by the at least one processor cause the device to add the fact to the knowledge base embedding with the computer implemented method according to the present invention.

A computer program for that purpose comprises computer readable instructions that, when executed by a computer, cause the computer to execute the method.

Further embodiments of the present invention are derivable from the following description and the figures.

FIG. 1 schematically depicts a device for filling a knowledge base, according to an example embodiment of the present invention.

DETAILED DESCRIPTION OF EXAMPLE EMBODIMENTS

Figure 1:
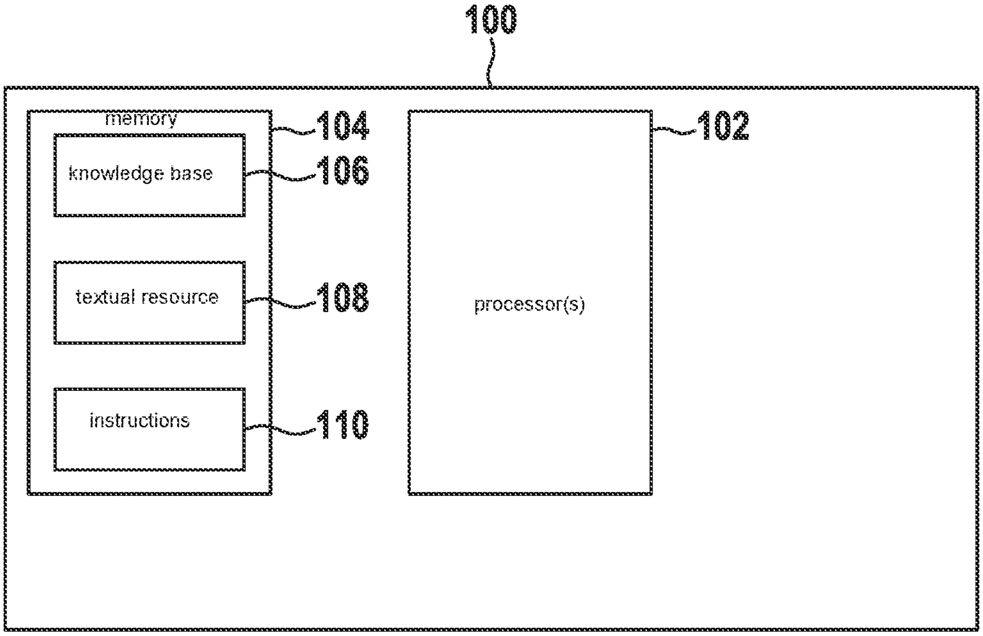

FIG. 1 depicts schematically a device 100 for filling a knowledge base. The knowledge base comprises for example a knowledge graph.

The device 100 comprises at least one processor 102 and at least one memory 104.

The at least one memory 104 in the example stores the knowledge base 106 that represents the knowledge base and a textual resource 108.

The at least one memory 104 comprises instructions 110 that, when executed by the at least one processor 102 cause the device 100 to add a quantity fact to the knowledge base 106 with the computer implemented method that will be described below.

The instructions 110 in the example cause the device 100 to determine the knowledge graph, when the instructions 110 are executed by the at least one processor 102.

The knowledge graph represents an interlinked collection of factual information, i.e., facts. A fact is in the example encoded as a triple. The triple in the example comprises several elements.

The knowledge graph in the example is configured to comprise facts comprising an entity, a relation, and an object. These facts are for example triples or lists of <subject; predicate; object>.

In the example, in the facts, the subject and the object are entities of the knowledge graph and the predicate is a relation between these in the knowledge graph.

The knowledge graph in the example is configured to comprise quantity facts comprising an entity, a relation, a quantity and a unit. In one example, the quantity facts are of the form <subject; predicate; quantity:unit>. In the example, in the quantity facts the subject is an entity of the knowledge graph, the predicate is a relation between the entity and the quantity and the unit.

A quantity fact is in one example a triple or a list of an entity, a relation and a quantity, wherein the quantity has a value and a unit. The quantity facts are e.g. triples of <subject; predicate; object> that comprise quantity and unit in their object. A quantity fact is in one example a tuple or a list of the entity, the relation, the value, and the unit.

Figure 2:
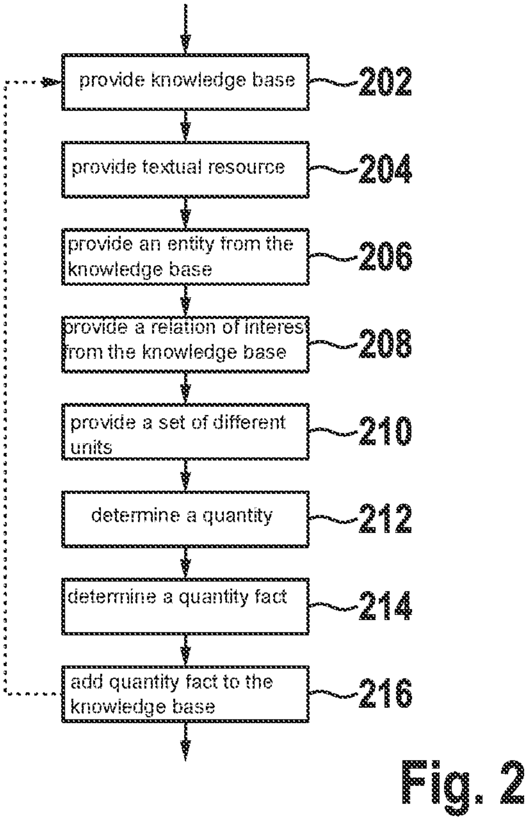
FIG. 2 depicts steps in a method for filling the knowledge base, according to an example embodiment of the present invention.

A computer-implemented method for filling the knowledge base 106 is described below with reference to FIG. 2.

In the description of the method, words, numbers, and abbreviations of units are used in some examples to describe the principles of the method. In the method these words, numbers, and/or abbreviations are represented by alphanumerical or numerical representations thereof, e.g. embeddings in an embedding space or unique identifiers.

An input to the method is in the example a given knowledge base 106. The example is described for a given knowledge graph, a set of entities that will serve as subjects for the quantity facts to be extracted from the textual resource 108, a relation of interest that may be sampled from the knowledge base 106 or given as input by a user and a set of units of relevance.

The method extracts quantity facts from text at large scale, the output of which can be directly added to the knowledge base 106. For instance, the method extracts, given a set of material names, e.g. water; chlorine, a relation of interest, e.g. has_viscocity, and units of interest, e.g. millipascal per second, from a large collection of scientific documents and/or publications the facts describing the viscosity property of materials. For example, the output of the method comprises a triple <water; has viscosity; 1:0016: mlpsi>.

In the following, the method will be described for a knowledge graph that comprises triples that provide information about a type of entities representing a building as subject with a "type" relation as predicate of the triple to an entity representing the type "building" as object and a geographic location of entities representing a building with a "located_in" relation as predicate to an object that represents a geographic location:

<Eiffel_Tower; located_in; Paris>
<Eiffel_Tower; type; building>
<Sydney_Tower; located_in; Sydney>
<Sydney_Tower; type; building>

<Burj_Khalifa; located_in; Paris>

<Burj_Khalifa; type; building>

These are facts of the knowledge graph that are numerically represented in the triple.

Aspects of the method will be described for a relation of interest "height" that may be used to determine a fact, i.e. a triple that relates an entity representing a building as subject to an object comprising the quantity of a height of a building and the unit of the height. Aspects of the method will be described for a relation of interest "cost" that may be used to determine a fact, i.e. a triple that relates an entity representing a building as subject to an object comprising the quantity of a cost of a building and the unit of a currency the cost is provided in. The relations of interest are numerically represented in the example as tensors, in particular vectors, of the same dimension as predicates are in facts of the knowledge base 106.

The method will be described with a numerical representation of the textual resource 108 representing knowledge about buildings.

The output of the method described is for example a numerical representation of a fact <Eiffel_Tower; height; 1063:feet> or a fact <Eiffel_Tower; cost; 1500000: $>

The method is executed in iterations.

The method comprises a step 202.

The step 202 comprises providing the knowledge base 106. In the example, the knowledge base 106 comprises facts in particular facts of the knowledge graph.

In a first iteration, the facts are given facts of the knowledge base 106. In following iterations, the knowledge base 106 comprises quantity facts that are determined with the method as will be described below.

The method comprises a step 204.

The step 204 comprises providing the textual resource 108. The textual resource 108 is a text at large scale, e.g. a text corpus, comprising the information about buildings. The same textual resource 108 may be used in the iterations. Different textual resources may be used in different iterations as well.

The method comprises a step 206.

The step 206 comprises providing an entity from the knowledge base 106. The same entity may be selected in the iterations.

Different entities may be selected in different iterations as well.

The entity in the example is an entity that represents a subject, e.g. Eiffel_Tower, Sydney_Tower, Burj_Khalifa.

The method comprises a step 208.

The step 208 comprises providing a relation of interest from the knowledge base 106. The same relation of interest may be selected in the iterations. Different relations of interest may be selected in different iterations as well.

In one example, the relation of interest is "height". In one example, the relation of interest is "cost". Any other relation of interest that is available in the knowledge base 106 may be used instead.

The method comprises a step 210.

The step 210 comprises providing a set of different units.

In one example, different units of the height are represented by the set, e.g. {meter, feet} or {m, ft}. In one example different units of currency for the cost are represented by the set, e.g. {Dollar, Euro} or {$, €}.

Any other unit of a relation of interest that is available in the knowledge base 106 may be used instead.

The method comprises a step 212.

The step 212 comprises determining a quantity comprising a unit within the set of different units that is within the textual resource 108. These are determined depending on the entity, the relation, and the set of different units.

In step 212, the method extracts at least one quantity from the textual resource 108.

Figure 3:
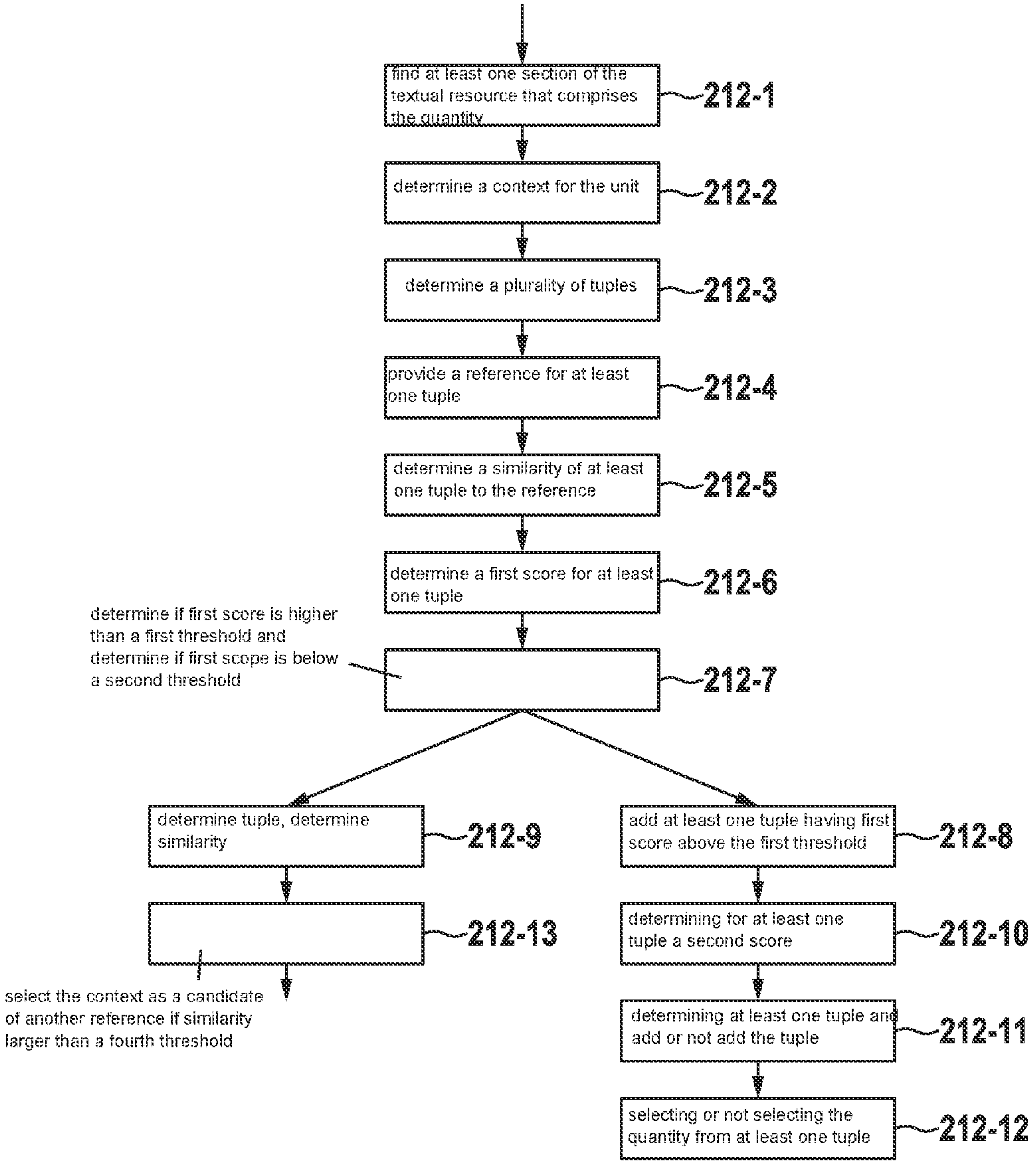
FIG. 3 depicts further steps in the method for filling the knowledge base, according to an example embodiment of the present invention.

The step 212 of determining the quantity in one example comprises further steps 212-1, . . . , 212-19 that are described below with reference to FIG. 3.

Afterwards, a step 214 is executed.

The step 214 comprises determining a quantity fact comprising the entity, the relation, the the quantity and the unit.

In step 214, the method determines the quantity fact for adding to the knowledge base 106.

Determining the quantity fact comprises in one example selecting a tuple from a group of tuples. Determining the group of tuples is described below.

Determining the quantity fact comprises in one example selecting a tuple from a set of candidate facts. Determining the candidate facts is described below.

In one example, the method comprises selecting the tuple that has a highest rank in an order of tuples in the group of tuples or in the set of candidate facts.

Afterwards a step 216 is executed.

The step 216 comprises adding the quantity fact to the knowledge base.

Afterwards, the method may continue with step 202 or end.

The further steps are described with reference to FIG. 3. The further steps may be executed in iterations.

The step 212-1 comprises finding at least one section of the textual resource 108 that comprises the quantity. This section is searched and found for example depending on the unit. In one example, the unit is searched in the textual resource 108 and the section that is found either comprises the unit or comprises a unit for the this quantity.

In one example, step 212-1 comprises determining a pre-processed embedding of the textual resource 108 by pre-processing the textual resource 108 as follows:

Processing the textual resource 108, e.g. the text corpus, with Open IE, e.g. as described in:

Saha, S., Mausam, "Open information extraction from conjunctive sentences;" in: Bender, E. M., Derczynski, L., Isabelle, P. (eds.) Proceedings of the 27th International Conference on Computational Linguistics, COLING 2018, Santa Fe, New Mexico, USA, Aug. 20-26, 2018. pp. 2288-2299. Association for Computational Linguistics (2018), https://www.aclweb.org/anthology/C18-1194/

Saha, S., Pal, H., Mausam; "Bootstrapping for numerical open IE;" in: Proceedings of the 55th Annual Meeting of the Association for Computational Linguistics, A C L 2017, Vancouver, Canada, July 30-August 4, Volume 2: Short Papers (2017)

Recognizing and disambiguating named entities for entity linking for example as described in:

Hoffart, J., Yosef, M. A., Bordino, I., Fuirstenau, H., Pinkal, M., Spaniol, M., Taneva, B., Thater, S., Weikum, G.; "Robust disambiguation of named entities in text;" in: Proceedings of the 2011 Conference on Empirical Methods in Natural Language Processing, EMNLP 2011, 27-31 Jul. 2011, John McIntyre Conference Centre, Edinburgh, UK, A meeting of SIGDAT, a Special Interest Group of the ACL (2011).

Recognizing and disambiguating named entities for coreference resolution for example as described in:

Lee, K., He, L., Zettlemoyer, L.; "Higher-order coreference resolution with coarse-to-fine inference;" in: Walker, M. A., Ji, H., Stent, A. (eds.) Proceedings of the 2018 Conference of the North American Chapter of the Association for Computational Linguistics: Human Language Technologies, NAACL-HLT, New Orleans, Louisiana, USA, Jun. 1-6, 2018, Volume 2 (Short Papers). pp. 687-692. Association for Computational Linguistics (2018), https://doi.org/10.18653/v1/n18-2108

The at least one section of the textual resource 108 that comprises the quantity is found in this example in the pre-processed embedding of the textual resource 108.

Afterwards a step 212-2 is executed.

The step 212-2 comprises determining a context X for the unit within the numerical representation of the section depending on the numerical representation of the unit.

Afterwards a step 212-3 is executed.

The step 212-3 comprises determining a plurality of tuples that each comprises the entity, the quantity, the unit, and the context X.

In one example, an output of step 212-1 is cast in the steps 212-2 and 212-3 into tuples that represent Qfacts following Qsearch.

A Qfact is a tuple of the form F=(e,q,X) where e is an entity of the knowledge base 106, q comprises a quantity, i.e. a numeric value, and a unit of the quantity from the knowledge base 106. The context X captures the context in the form of a set of cue words that are informative for understanding the relation between an entity e and a quantity q. In the method, numerical representations of Qfacts are processed that comprise the entity e, the quantity q, i.e. the value and the unit, and the context X.

Example 1

Given a text snippet "The Eiffel Tower is 1,063 ft high and costs about $1.5 million to construct." with disambiguated entity: "Eiffel Tower"→<Eiffel_Tower> and quantities: "1,063 ft"→<1063, feet> and "$1.5 million"→<1500000, $>; Open IE generates two tuples <The Eiffel Tower; is; 1,063 ft high> and <The Eiffel Tower; costs; about $1.5 million; to construct>. Mapping them with the entities and quantities and dropping all stop words, the method obtains:

F1:e=<Eiffel_Tower>; q=(1062, feet); X="high"

F2:e=<Eiffel_Tower>; q=(1500000, $); X="costs construct"

In one example, the method collects from the plurality of tuples, a set of candidate tuples, referred to as candidate Qfacts. These candidate tuples are optionally filtered and ranked by a predicate-targeted query as described below. The predicate-targeted query is generated in one example for the relation of interest as predicate, e.g. "height", depending on a schema of the knowledge base 106.

For example a predicate-targeted query p is a tuple T(p)=(pd, pu, pX) wherein pd is a predicate domain from the schema of the knowledge base 106, e.g. building, pu is a set of possible units for the predicate values, e.g. meter, feet, pX={pX0, pX1, . . . } is a query context, in the example a multiset wherein each pXi is a bag of words expressing context for one predicate p, e.g. "height", "stands tall".

In the method, the predicate-targeted query is processed that comprises the predicate domain pd, the set of possible units pu and the multiset pX.

To this end, the method may comprise an optional step 212-4.

The step 212-4 comprises providing a reference for at least one tuple in the plurality of tuples.

Providing the reference pXi for the at least one tuple may comprise providing a reference predicate domain pd for the knowledge base 106.

Providing the reference pXi for the at least one tuple may comprise providing a reference entity e from the knowledge base 106.

Providing the reference pXi for the at least one tuple may comprise providing a set of reference units pu from the set of units.

Providing the reference pXi may comprise determining, for at least one tuple of the plurality of tuples the reference pXi that is more similar to the context X in this tuple than to a context in at least one other tuple of the plurality of tuples.

In the example, the reference pXi is a bag of words.

In an initial iteration i=0, an initial targeted query T0(p) may be constructed with a fixed domain pd, units pu that are taken form the schema of the knowledge base 106, and context comprising of only pX={pX0}, with pX0 being a label in the knowledge base 106 of a predicate, e.g. "height" that represents the relation of interest. In further iterations, a targeted query Ti(p) may be determined as described below.

Afterwards a step 212-5 is executed.

The step 212-5 comprises determining a similarity of at least one tuple of the plurality of tuples to the reference pXi for at least one tuple of the plurality of tuples This means determining a similarity of at least one Qfact in the set of candidate Qfacts to its reference.

Determining the similarity may comprise determining a similarity of the context in at least one tuple of the plurality of tuples to the reference pXi. The similarity represents the semantic relatedness of the Qfact to its reference.

The similarity may be determined for the tuples in the plurality of tuples. The similarity may be determined, as in the example, for at least one tuple of the plurality of tuples only if a numerical representation of the entity of the at least one tuple is mapped by a numerical representation of the reference predicate to a numeric representation that is within a predetermined distance to the numerical representation of the reference entity and if the unit of the at least one tuple is within the set of reference units. These numerical representations may be in an embedding space. For example, a context-embedding-distance based on contextualized BERT embeddings may be determined as described for QSearch.

Afterwards a step 212-6 is executed.

The step 212-6 comprises determining a first score for at least one tuple in the plurality of tuples depending on the distance to its reference pXi, wherein the score indicates a confidence for that tuple being selectable for determining the quantity fact.

The first score in on example is determined from a Qfact F=(e,q,X) with respect to the targeted query Ti(p)=(pd, pu, pX) as:

$$rel(f, t(p)) = \begin{cases} \max_{pX_i \epsilon pX} sim(X, pX_i) & \text{if } e \epsilon pd,\ q \epsilon pu \\ 0 & \text{otherwise} \end{cases}$$

where sim denotes a semantic similarity between two bags of words. While various options for the choice of sim exist, in the example the context-embedding-distance according to Qsearch is used based on contextualized BERT embeddings, and rel denotes a relevance score that ranks all Qfacts, whose entity and quantity match with the domain and units of the target predicate, i.e. the predicate that represents the relation of interest, based on the semantic embedding distance between their context X and the best-matched context in the query pXi.

The output of step 212-6 is in one example a ranked list of tuples. This means a ranked list of Qfacts is determined. The targeted query Ti(p) is in one example used to rank the tuples in the plurality of tuples in terms of their semantic relatedness. This means, the candidate Qfacts are ranked in terms of their semantic relatedness.

In one example, in the step 212-7 it is determined, if the first score of at least one tuple in the ranked list of tuples indicates that the confidence for that tuple being selectable for determining the quantity fact is higher than a first threshold or not.

For the tuples having a first score that indicates that the confidence for this tuple being selectable as the quantity fact is higher than the first threshold, a step 212-8 is executed.

In the step 212-7 it is determined, if the first score of at least one tuple in the ranked list of tuples indicates that the confidence of that tuple being selectable for determining the quantity fact that is below a second threshold or not. For the tuples having a first score that indicates that the confidence of this tuple being selectable as the quantity fact is below the second threshold a step 212-9 is executed.

The first threshold is for example a confidence-threshold parameter. In one example, a high-confidence group H is determined in the ranked list of Qfacts. The high-confidence group H comprises Qfacts with a score $rel(F,T(p))\geq\gamma$ In one example, a low-confidence group L is determined in the ranked list of Qfacts. The low-confidence group L comprises Qfacts with a score $rel(F,T(p))<\gamma$.

For setting $\gamma$ in a principled way, the method may employ the Deep Open Classification (DOC) method with Gaussian fitting using distant supervision from a set of ground-truth facts of the target predicate extracted from Wikidata according to:

Shu, L., Xu, H., Liu, B.; "DOC: deep open classification of text documents;" in: Proceedings of the 2017 Conference on Empirical Methods in Natural Language Processing, EMNLP 2017, Copenhagen, Denmark, Sep. 9-11, 2017. pp. 2911-2916 (2017).

The step 212-8 comprises adding at least one tuple having a first score that indicates that the confidence of this tuple being selectable for determining the quantity fact is above the first threshold to a group of tuples. The group of tuples represents Qfacts in the high-confidence group H.

Afterwards an optional step 212-10 is executed.

The step 212-10 comprises determining for at least one tuple in the group of tuples a second score depending on the the quantity in this tuple, wherein the second score is indicative of a likelihood for that tuple being selectable as the fact.

The majority of Qfacts in the high-confidence group H are assumed to be likely correct, i.e. capturing the target predicate and having reasonable quantity values. However, a small fraction could still be spurious. To filter these out, the method may comprise devise a denoising technique based on characterizing a value distribution of the high-confidence group H. The denoising technique and the second score is described below. The idea is to spot outliers that are likely incorrect, such as buildings with height 1 meter or 5 km. This way, the method eliminates many false positives.

Afterwards a step 212-11 is executed.

The step 212-11 comprises determining at least one tuple for the set candidate facts that comprises the entity, the quantity, the unit, and the context X. The candidate facts represent Qfact candidates for determining the quantity fact.

The step 212-11 comprises for example, selecting a tuple from the group of tuples and either adding this tuple to the set of candidate facts, or not adding that tuple to the set of candidate facts.

The step 212-11 may comprise determining if the second score for a tuple, that is selected from the group of tuples, indicates that the likelihood of that tuple being selectable as the fact is higher than a third threshold or not.

The step 212-11 may comprise adding that tuple to the set candidate facts if the second score indicates that the likelihood of that tuple being selectable for determining the quantity fact is higher than the third threshold, and otherwise not selecting that tuple.

Step 212-11 may be repeated until at least one tuple is added or the tuples in the group of tuples are processed.

Afterwards a step 212-12 is executed.

The step 212-12 comprises depending on its context X either selecting the quantity from at least one tuple in the set of candidate facts as candidate for the quantity of the fact or not.

The previous steps may leave some incorrect or inaccurate Qfact candidates e.g. due to the following:

1) for the same entity, different quantities can be stated at different precision levels (e.g., 302 m, ca. 300 m, more than 300 m);
2) different units can cause deviations after conversion (e.g., 1063 ft-320 m);
3) false statements in the original text in the textual resource 108;
4) time-variant values or otherwise context-dependent differences in values, e.g., company revenues for a certain year or quarter, or for a certain sales region.

To resolve these kinds of noise and conflicts, the method may comprise grouping Qfacts for the same entity-predicate pair by temporal scopes, obtained from a text passage of the textual resource 108 or a document timestamp if available, e.g., for news articles. Within each of these groups, the method may select the most frequent value. The resulting Qfacts are the candidates for determining the quantity fact.

The step 212-12 may comprise selecting at least one tuple from the plurality of tuples that comprises a context that is more similar to its reference pXi than a context in a second tuple of the plurality of tuples is to its reference. In the example, the tuple having the context that is most similar to its reference pXi is selected. In the example, this tuple is selected from the set of candidate facts.

In step 212-9, the method reconsiders the low-confidence group L of Qfact candidates. This group might contain some further relevant statements.

The step 212-9 in one example comprises determining a tuple in the plurality of tuples with the same entity as at least one tuple from the high-confidence group H.

The step 212-9 may comprise determining a similarity depending on a quantity in at least one tuple representing a Qfact from the low confidence group L and the quantity in the at least one tuple representing a Qfact of the high confidence group H.

This procedure detects a positive instance in the low-confidence group L based on its similarity to the at least one tuple representing a Qfact from the high-confidence group H.

The step 212-9 may comprise determining the similarity depending on a normalization of the quantity in at least one of the tuples. The normalization is in one example determined depending on a unit in one of the tuples. The normalization is in one example determined depending on the units in both these tuples.

The step 212-9 may comprise normalizing quantities e.g. as described in Roy, S., Vieira, T., Roth, D.; "Reasoning about quantities in natural language;" Transactions of the Association for Computational Linguistics 3 (2015).

Afterwards a step 212-13 is executed.

The step 212-13 comprises selecting the context X as a candidate for another reference pXi if the similarity is larger than a fourth threshold.

This automatically extends the predicate contexts pX with additional relevant phrases. Automatically extending the predicate contexts pX with additional relevant phrases is described below.

Example 2

If (Eiffel_Tower, height, 324 m) is added to the knowledge base 106 with the method, and (Eiffel_Tower, 324 m, "stand tall") is a Qfact from the low-confidence group L, the query expansion mechanism described above collects a token "stand tall" as a paraphrasing of the target predicate "height". The initial targeted query T0(p) is expanded by setting pX to pX∪{"stand tall" }, which results in T1(p) with this updated context.

These steps 209 and 212-13 are repeated for example until a stopping criterion is met. The stopping criterion may be that the query cannot be expanded further. The stopping criterion may be that a maximum number of iterations k is reached. In one example k=10 iterations are used.

For denoising, the denoising technique e.g. in step 212-10, comprises normalizing in particular all quantity values. Normalizing for example comprises converting the quantity values to the same standard unit, e.g., meters for height. Normalizing for example comprises combining Qfacts with a differences between their normalized values that is smaller than a threshold.

This threshold is for example 5 percent. The difference is for example determined as a relative difference of the quantity to a median of the quantities for the same subject, e.g. taking a median of values like 300, 302 and 310 meters for a subject representing the Eiffel Tower.

In one example, normalized quantity values are selected from the high-confidence group H of Qfacts. Denoising in this case has the goal to filter out noisy values from the high-confidence group H based on a distribution of the quantity values. In this aspect, the method may comprise determining a change in the distribution if a certain quantity value is removed from the high-confidence group H.

The method may comprise determining, for each value v∈H, two likelihood scores: an original likelihood score o_score and a consistency likelihood score c_score.

The o_score is a likelihood of value v generated from the distribution constructed from the full set of quantity values in the high-confidence group H, including the value v.

The c_score is determined from a plurality of distributions that are constructed from random subsets of the high-confidence group H excluding the value v.

The c_score is for example determined based on a consistency learning technique. Consistency learning is for example described in J. Yagnik and A. Islam; "Learning people annotation from the web via consistency learning;" in Proceedings of the 9th ACM SIGMM International Workshop on Multimedia Information Retrieval, MIR 2007, Augsburg, Bavaria, Germany, September 24-29, 2007, 2007.

In this example, the value v is considered as noise if a noise score for the value v differs by an amount larger than a threshold μ. The noise score is determined in the example depending on a difference between the o_score and the c_score, e.g. as follows:

$$\text{noise\_score}(v) = \frac{\text{o\_score}(v) - \text{c\_score}(v)}{\max(|\text{o\_score}(v)|, |\text{c\_score}(v)|)}$$

In the example, all Qfacts in the high-confidence group H that have a noise score less than p are filtered out. Filtering out in this context refers to not considering these Qfacts as tuple in the set of candidate facts.

The o_score is for example determined depending on a distribution f from the high-confidence group H using e.g. Kernel Density Estimation, with f being a probability density function:

$$f(v) = \frac{1}{|H| * b} \sum_{v' \varepsilon H} \Phi\left(\frac{v - v'}{b}\right)$$

with a bandwidth parameter b and where Φ is a kernel function. In the example, a Gaussian kernel is used. The Gaussian kernel is defined e.g. as $$\Phi(x) = \frac{1}{\sqrt{2\pi}} e^{\frac{-x^2}{2}}$$

The bandwidth b is for example determined with the Improved Sheather Jones method for automatic choice of the optimal bandwidth. This bandwidth may be determined as described in Z. I. Botev, J. F. Grotowski, D. P. Kroese, et al.; "Kernel density estimation via diffusion;" The annals of Statistics, 38(5):2916-2957, 2010.

The o_score of value vεH is in one example:

$$\text{o\_score}(v) = P(f \to v) \int_{x: f(x) \le f(v)} f(x)dx$$

This means, the likelihood of value v as the integral of f over all values whose density is not greater than f(v). In one example, as the kernel density estimation could have multiple local extrema, the method comprises approximating this integral with Simpson's rule with segmentation.

Determining the c_score in one example comprises randomly sampling a small probe set of values from the high-confidence group H, e.g. 10% of the high-confidence group H and using the remaining values of the high-confidence group H to construct a distribution. The constructed distribution is then used to measure the likelihood scores of the values in the probe set.

This sampling and cross-validation process is repeated in a large number of sampling iterations. The c_score of a value v is for example computed as an average predicted likelihood, aggregated over all cases where v was in the probe set.

At each sampling iteration, the distribution construction and the value likelihood inference for the c_score determined as described for the o_score. The only difference is that the optimal bandwidth value b is constructed from H when computing the o_score is also used for constructing distributions from sample subsets of the high-confidence group H.

This added noise changes only the shape of the distribution, which is defined by the samples, but not its smoothness, which is defined by the bandwidth b.

The denoising in one example outputs positive results H+. The positive results H+ are determined by removing all noisy Qfacts from the high-confidence group H, i.e. all Qfacts, which have a high noise score ≥μ. In one example, μ is 0.3. In one example, the positive results H+ are considered as the group of tuples for addition to the knowledge base and subsequently processed as described above.

The denoising in one example outputs an estimation of the distribution f from the positive results H+. The estimation of the distribution f may be used for automatically extending of the predicate contexts pX with additional relevant phrases, i.e. query expansion, as described in the next section.

An input to the automatically extending of the predicate contexts pX with additional relevant phrases comprises the positive results H+ and Qfacts in the low-confidence group L that are ranked low with the relevance score rel(F,T(p)).

A goal of this automatically extending is to achieve a better coverage of the fact extraction process described above. Specifically, with the current predicate-targeted query at a iteration i: $T_i(p)=(pd,pu,pX=\{pX_0, \ldots, pX_i\})$, the method comprises learning a candidate context pX'. The method further comprises expanding the query context of the next iteration i+1 depending on the candidate context pX'.

This query expansion technique relies on a redundancy in the data, i.e. a presence of the same entity and approximately similar quantities in both, the positive results H+ and the low-confidence group L.

This will be described with supported Qfacts. A given Qfact F=e,q,X) from the low-confidence group L is a supported Qfact, if in the positive results H+ there exist a Qfact F'=(e, q', X') such that q≈q'. This means, the Qfact F' has the same entity and approximately the same quantity as F, after converson to the same standard unit.

A supported set supp_set(L,H+) is a set of all supported Qfacts in the low-confidence group L.

In one example, the high-confidence group H comprises the positive results H+={Eiffel_Tower, 324 m, "height"), (Burj_Khalifa, 2712 ft, "reached height")}. In this example, the following Qfacts are supported:

F1:e=<Eiffel_Tower>; q=(1062, feet); X="high"

F1:e=<Eiffel_Tower>; q=(324, m); X="stand tall"

F2:e=<Eiffel_Tower>; q=(1062, ft); X="rise"

F3:e=<Burj_Khalifa>; q=(2722, ft); X="originally tall"

F4:e=<Burj_Khalifa>; q=(828, m); X="rise height").

Not supported in this example are e.g.

F5:e=<The_Shard>; q=(1017, ft); X="tall"

F6:e=<Sydney_Tower>; q=(309, m); X="stand high"

F7:e=<Eiffel_Tower>; q=(328, ft); X="base wide".

The entities e of F5 and F6 do not appear in the positive results H+, while the quantity of F7 deviates too much, i.e. more than the threshold. Given L={F1, . . . , F7} from above, its supported set is as follows: supp-set(L, H+)={F1, F2, F3, F4}

The method may comprise determining, for each candidate context pX' appearing in the low-confidence group L, a number of statements in the low confidence group L with this context that rephrase facts from the positive results H+ in the high-confidence group H.

For a given candidate context pX', its support is a number of Qfacts in the supported set of L whose context includes pX':

$$supp(pX', L, H+) = \left|\left\{(e, q, X) \epsilon \text{supp\_set}(L, H+): pX' \subseteq X\right\}\right|$$

In one example, for F1, . . . , F7 as described above and the positive results H+ in the high-confidence group and the low-confidence group L, the method e.g. determines:

$$supp(\text{"stand"}, L, H+|\{F1\}| = 1,$$

$$supp(\text{"tall"}, L, H+|\{F1, F3\}| = 2,$$

$$supp(\text{"rise"}, L, H+|\{F2, F4\}| = 2$$

The candidate context pX' is not limited to a single token, e.g. word. The candidate context pX' may comprise more than one token. E.g. for a candidate context pX' that comprises two tokens "rise height" it holds that supp("rise height", L, H+)=|{F4}|=1.

In one example, the support is normalized, e.g. by a highest support value among the candidate contexts pX" that are processed by the method. A corresponding relative support of the candidate context pX' is:

$$\text{r\_supp}(pX', L, H+) = \frac{supp(pX', L, H+)}{\max\limits_{pX''} supp(pX'', L, H+)}$$

In one example, high support is not sufficient for a candidate context pX' to be a paraphrase or refinement of the original predicate p.

In one example, uninformative words, that also have a high support, e.g. "about", "during", "up" are filtered out by determining an inverse document frequency and comparing their inverse document frequency to a threshold. The threshold is for example set to a value that is larger than an inverse document frequency of uninformative words.

To more effectively select promising candidate context pX' for query expansion, the method may comprise additionally taking the quantities of the respective statements into account. In one example, an expansion set exp_set(pX', L) of a candidate context pX' is determined that includes Qfacts in the low-confidence group L whose context contains pX':

$$\text{exp\_set}(pX', L) = \{(e, q, X) \epsilon L \mid pX' \subseteq X\}$$

For the low-confidence group L as described above, this results in $$\text{exp\_set}(\text{"stand"}, L) = \{F_1, F_6\}$$

-continued $$\text{exp\_set}(\text{``tall''}, L) = \{F_1, F_3, F_5\}$$

$$\text{exp\_set}(\text{``rise''}, L) = \{F_2, F_4\}$$

The expansion set comprises the Qfacts in the low-confidence group that contain pX', regardless of whether they are supported by any of the facts in the high-confidence group H or not. These Qfacts are statements that could be added to the high confidence group H if pX' is chosen to expand the query.

In one example, a quality of an expansion set is determined by determining quantity values of its Qfacts t the value distribution f.

A distribution confidence is for example determined as an average likelihood of the quantity values in the expansion set, generated by the distribution f constructed from the positive results H+ of the high-confidence group H+:

$$\text{d\_conf}(pX', L, H+) = \frac{1}{|\text{exp\_set}(pX', L)|} \sum_{(e,q,X) \in \text{exp\_set}(pX', L)} P(f \to q)$$

where P(f→q) is the integral function described above.

Accordingly, a good candidate context for paraphrasing or refining the original predicate p should have an expansion set whose quantities comply with the reference distribution.

As a second signal for scoring the suitability of an expansion set, the method may use the original relevance scores of its Qfacts.

A querying confidence q_conf(pX',L) is for example determined as an average relevance score of the Qfacts in the expansion set relative to the predicate-targeted query $T_i(p)$ at a given iteration i:

$$\text{q\_conf}(pX', L) = \frac{1}{|\text{exp\_set}(pX', L)|} \sum_{F \in \text{exp\_set}(pX', L)} rel(F|T_i(p)))$$

The candidate contexts pX' may be ranked according to any single one of the relative support, the querying confidence and the distribution confidence.

In one example, a suitability, e.g. expansion_score(pX', L,H+), of a candidate context pX' the method may comprise determining a weighted sum of the relative support, the querying confidence and the distribution confidence:

$$\text{expansion\_score}(pX', L, H+) = w_1 \text{r\_supp}(pX', L, H+) + w_2 \text{d\_conf}(pX', L, H+) + w_3 \text{q\_conf}(pX', L, H+)$$

wherein weights $w_1, \ldots, w_3$ are selected or given. The candidate contexts pX' may be ranked according to their suitability, e.g. the expansion_score(pX',L,H+) in this case.

In the exemplary method, the second score may be any single one of the relative support, the querying confidence and the distribution confidence or may be their weighted sum expansion score.

What is claimed is:

1. A computer-implemented method for adding at least one quantity fact to a knowledge base, the knowledge base being a knowledge graph, the method being performed by a computer comprising at least one processor and comprising the following steps:

providing the knowledge base;

providing a textual resource;

obtaining, by the computer, an entity from a set of entities of the knowledge base that serve as subjects for quantity facts to be extracted from the textual resource;

obtaining, by the computer, a relation of interest from the knowledge base, wherein the relation of interest is sampled from the knowledge base or received as input;

obtaining, by the computer, from a schema of the knowledge base, a set of different units associated with the relation of interest;

providing, by the computer and for the relation of interest, a reference comprising a reference predicate corresponding to the relation of interest, a reference entity from the knowledge base, a set of reference units from the set of different units, and a set of reference contexts, wherein a numerical representation of the entity, a numerical representation of the reference predicate, and a numerical representation of the reference entity are embeddings in an embedding space;

determining, by the computer, a quantity including a unit within the set of different units that is within the textual resource depending on the entity, the relation of interest, and the set of different units, wherein determining the quantity comprises:

finding, by the computer, a section of the textual resource that includes at least one quantity having a unit within the set of different units;

determining, by the computer, a context for the unit within the section;

determining, by the computer, a plurality of tuples, each tuple of the plurality of tuples including the entity, a respective quantity, a respective unit, and a respective context;

for at least one tuple of the plurality of tuples, determining, by the computer, whether (i) the numerical representation of the entity, when mapped in the embedding space by the numerical representation of the reference predicate, is within a predetermined distance in the embedding space of the numerical representation of the reference entity, and (ii) the respective unit of the at least one tuple is within the set of reference units;

when the numerical representation of the entity, when mapped in the embedding space by the numerical representation of the reference predicate, is within the predetermined distance in the embedding space of the numerical representation of the reference entity, and the respective unit of the at least one tuple is within the set of reference units, determining, by the computer, a similarity between the respective context of the at least one tuple and at least one reference context of the set of reference contexts;

determining, by the computer, a first score for the at least one tuple depending on the similarity, the first score indicating a confidence that the at least one tuple is selectable for determining the quantity fact;

adding, by the computer, the at least one tuple to a set of candidate facts when the first score satisfies a high-confidence criterion by being greater than or equal to a first threshold;

when the first score of a further tuple of the plurality of tuples satisfies a low-confidence criterion by being lower than at least the first threshold, determining, by the computer, that the further tuple is not in the set of candidate facts and has a same entity as a tuple in the set of candidate facts;

determining, by the computer, a quantity similarity depending on a normalization of (i) the respective quantity of the further tuple and (ii) the respective quantity of the tuple in the set of candidate facts, the normalization being determined depending on at least one of the respective unit of the further tuple or the respective unit of the tuple in the set of candidate facts;

selecting, by the computer, the respective context of the further tuple as an additional reference context for the relation of interest when the quantity similarity is larger than a second threshold;

expanding, by the computer, the set of reference contexts to include the additional reference context; and repeating, by the computer using the expanded set of reference contexts, the determining of the similarity, the determining of the first score, and the adding of a tuple to the set of candidate facts for at least one tuple of the plurality of tuples:

determining, by the computer, a quantity fact including the entity, the relation of interest, the quantity, and the unit, wherein determining the quantity fact comprises selecting a tuple from the set of candidate facts after the repeating using the expanded set of reference contexts, the selected tuple including the quantity and the unit of the quantity fact; and adding, by the computer, the quantity fact to the knowledge base.

2. The method according to claim 1, further comprising:

determining for a tuple in the set of candidate facts, a second score depending on the respective quantity in the tuple, wherein the second score is indicative of a likelihood that tuple is selectable for determining the quantity fact; and adding the tuple to a filtered set of candidate facts when the second score satisfies a quantity-likelihood criterion by being greater than a third threshold, wherein selecting the tuple from the set of candidate facts includes selecting the tuple from the filtered set of candidate facts.

3. A device for filling a knowledge base, the knowledge base being a knowledge graph, the device comprising:

at least one processor; and at least one non-transitory memory;

wherein the at least one memory is configured to store an embedding of the knowledge base and a textual resource, and stores instructions for adding at least one quantity fact to the knowledge base, the instructions, when executed by the at least one processor, causing the the at least one processor to perform the following steps:

providing the knowledge base;

providing a textual resource;

obtaining, by the computer, an entity from a set of entities of the knowledge base that serve as subjects for quantity facts to be extracted from the textual resource;

obtaining, by the computer, a relation of interest from the knowledge base, wherein the relation of interest is sampled from the knowledge base or received as input;

obtaining, by the computer, from a schema of the knowledge base, a set of different units associated with the relation of interest;

providing, by the computer and for the relation of interest, a reference comprising a reference predicate corresponding to the relation of interest, a reference entity from the knowledge base, a set of reference units from the set of different units, and a set of reference contexts, wherein a numerical representation of the entity, a numerical representation of the reference predicate, and a numerical representation of the reference entity are embeddings in an embedding space;

determining, by the computer, a quantity including a unit within the set of different units that is within the textual resource depending on the entity, the relation of interest, and the set of different units, wherein determining the quantity comprises:

finding, by the computer, a section of the textual resource that includes at least one quantity having a unit within the set of different units;

determining, by the computer, a context for the unit within the section;

determining, by the computer, a plurality of tuples, each tuple of the plurality of tuples including the entity, a respective quantity, a respective unit, and a respective context;

for at least one tuple of the plurality of tuples, determining, by the computer, whether (i) the numerical representation of the entity, when mapped in the embedding space by the numerical representation of the reference predicate, is within a predetermined distance in the embedding space of the numerical representation of the reference entity, and (ii) the respective unit of the at least one tuple is within the set of reference units;

when the numerical representation of the entity, when mapped in the embedding space by the numerical representation of the reference predicate, is within the predetermined distance in the embedding space of the numerical representation of the reference entity, and the respective unit of the at least one tuple is within the set of reference units, determining, by the computer, a similarity between the respective context of the at least one tuple and at least one reference context of the set of reference contexts;

determining, by the computer, a first score for the at least one tuple depending on the similarity, the first score indicating a confidence that the at least one tuple is selectable for determining the quantity fact;

adding, by the computer, the at least one tuple to a set of candidate facts when the first score satisfies a high-confidence criterion by being greater than or equal to a first threshold;

when the first score of a further tuple of the plurality of tuples satisfies a low-confidence criterion by being lower than at least the first threshold, determining, by the computer, that the further tuple is not in the set of candidate facts and has a same entity as a tuple in the set of candidate facts;

determining, by the computer, a quantity similarity depending on a normalization of (i) the respective quantity of the further tuple and (ii) the respective quantity of the tuple in the set of candidate facts, the normalization being determined depending on at least one of the respective unit of the further tuple or the respective unit of the tuple in the set of candidate facts;

selecting, by the computer, the respective context of the further tuple as an additional reference context for the relation of interest when the quantity similarity is larger than a second threshold;

expanding, by the computer, the set of reference contexts to include the additional reference context; and repeating, by the computer using the expanded set of reference contexts, the determining of the similarity, the determining of the first score, and the adding of a tuple to the set of candidate facts for at least one tuple of the plurality of tuples;

determining, by the computer, a quantity fact including the entity, the relation of interest, the quantity, and the unit, wherein determining the quantity fact comprises selecting a tuple from the set of candidate facts after the repeating using the expanded set of reference contexts, the selected tuple including the quantity and the unit of the quantity fact; and adding, by the computer, the quantity fact to the knowledge base.

4. A non-transitory computer-readable medium on which is stored a computer program including computer readable instructions for adding at least one quantity fact to a knowledge base, the knowledge base being a knowledge graph, the instructions being executable by a processor and, when executed by the processor, causing the processor to perform the following steps:

providing the knowledge base;

providing a textual resource;

obtaining, by the computer, an entity from a set of entities of the knowledge base that serve as subjects for quantity facts to be extracted from the textual resource;

obtaining, by the computer, a relation of interest from the knowledge base, wherein the relation of interest is sampled from the knowledge base or received as input;

obtaining, by the computer, from a schema of the knowledge base, a set of different units associated with the relation of interest;

providing, by the computer and for the relation of interest, a reference comprising a reference predicate corresponding to the relation of interest, a reference entity from the knowledge base, a set of reference units from the set of different units, and a set of reference contexts, wherein a numerical representation of the entity, a numerical representation of the reference predicate, and a numerical representation of the reference entity are embeddings in an embedding space;

determining, by the computer, a quantity including a unit within the set of different units that is within the textual resource depending on the entity, the relation of interest, and the set of different units, wherein determining the quantity comprises:

finding, by the computer, a section of the textual resource that includes at least one quantity having a unit within the set of different units;

determining, by the computer, a context for the unit within the section;

determining, by the computer, a plurality of tuples, each tuple of the plurality of tuples including the entity, a respective quantity, a respective unit, and a respective context;

for at least one tuple of the plurality of tuples, determining, by the computer, whether (i) the numerical representation of the entity, when mapped in the embedding space by the numerical representation of the reference predicate, is within a predetermined distance in the embedding space of the numerical representation of the reference entity, and (ii) the respective unit of the at least one tuple is within the set of reference units;

when the numerical representation of the entity, when mapped in the embedding space by the numerical representation of the reference predicate, is within the predetermined distance in the embedding space of the numerical representation of the reference entity, and the respective unit of the at least one tuple is within the set of reference units, determining, by the computer, a similarity between the respective context of the at least one tuple and at least one reference context of the set of reference contexts;

determining, by the computer, a first score for the at least one tuple depending on the similarity, the first score indicating a confidence that the at least one tuple is selectable for determining the quantity fact;

adding, by the computer, the at least one tuple to a set of candidate facts when the first score satisfies a high-confidence criterion by being greater than or equal to a first threshold;

when the first score of a further tuple of the plurality of tuples satisfies a low-confidence criterion by being lower than at least the first threshold, determining, by the computer, that the further tuple is not in the set of candidate facts and has a same entity as a tuple in the set of candidate facts;

determining, by the computer, a quantity similarity depending on a normalization of (i) the respective quantity of the further tuple and (ii) the respective quantity of the tuple in the set of candidate facts, the normalization being determined depending on at least one of the respective unit of the further tuple or the respective unit of the tuple in the set of candidate facts;

selecting, by the computer, the respective context of the further tuple as an additional reference context for the relation of interest when the quantity similarity is larger than a second threshold;

expanding, by the computer, the set of reference contexts to include the additional reference context; and repeating, by the computer using the expanded set of reference contexts, the determining of the similarity, the determining of the first score, and the adding of a tuple to the set of candidate facts for at least one tuple of the plurality of tuples;

determining, by the computer, a quantity fact including the entity, the relation of interest, the quantity, and the unit, wherein determining the quantity fact comprises selecting a tuple from the set of candidate facts after the repeating using the expanded set of reference contexts, the selected tuple including the quantity and the unit of the quantity fact; and adding, by the computer, the quantity fact to the knowledge base.

* * * * *